US009222389B2

(12) United States Patent
Henry et al.

(10) Patent No.: US 9,222,389 B2
(45) Date of Patent: Dec. 29, 2015

(54) SYSTEMS AND METHODS FOR CONTROLLING REDUCTANT DELIVERY TO AN EXHAUST STREAM

(75) Inventors: Cary Henry, Columbus, IN (US); Michael J. Ruth, Franklin, IN (US)

(73) Assignee: Cummins Inc., Columbus, IN (US)

(*) Notice: Subject to any disclaimer, the term of this patent is extended or adjusted under 35 U.S.C. 154(b) by 941 days.

(21) Appl. No.: 13/364,572

(22) Filed: Feb. 2, 2012

(65) Prior Publication Data

US 2013/0199157 A1 Aug. 8, 2013

(51) Int. Cl.
*F01N 3/00* (2006.01)
*F01N 3/20* (2006.01)
*F01N 9/00* (2006.01)

(52) U.S. Cl.
CPC *F01N 3/208* (2013.01); *F01N 9/00* (2013.01); F01N 2560/026 (2013.01); F01N 2560/06 (2013.01); F01N 2610/02 (2013.01); F01N 2610/06 (2013.01); F01N 2610/10 (2013.01); F01N 2610/12 (2013.01); F01N 2610/14 (2013.01); F01N 2610/146 (2013.01); F01N 2900/0411 (2013.01); F01N 2900/1602 (2013.01); F01N 2900/1616 (2013.01); F01N 2900/1806 (2013.01); Y02T 10/24 (2013.01); Y02T 10/47 (2013.01)

(58) Field of Classification Search
CPC ....... F01N 3/208; F01N 9/00; F01N 2610/06; F01N 2560/026

USPC .................................................... 60/274, 287
See application file for complete search history.

(56) References Cited

U.S. PATENT DOCUMENTS

| | | | |
|---|---|---|---|
| 5,809,774 A * | 9/1998 | Peter-Hoblyn et al. | 60/274 |
| 7,166,262 B2 | 1/2007 | Buzanowski | |
| 7,578,265 B2 | 8/2009 | Albrecht | |
| 2004/0057889 A1 | 3/2004 | Buzanowski | |
| 2005/0282285 A1 | 12/2005 | Radhamohan et al. | |
| 2009/0301068 A1 * | 12/2009 | Fujita et al. | 60/286 |
| 2010/0021780 A1 * | 1/2010 | Johannessen et al. | 429/19 |
| 2010/0062296 A1 * | 3/2010 | Johannessen | 429/19 |
| 2010/0101215 A1 * | 4/2010 | Wu et al. | 60/286 |
| 2010/0172763 A1 | 7/2010 | Habumuremyi | |
| 2010/0223914 A1 * | 9/2010 | Doring et al. | 60/286 |
| 2010/0300081 A1 * | 12/2010 | Fulks et al. | 60/299 |
| 2011/0146240 A1 * | 6/2011 | Wilhelm et al. | 60/274 |
| 2011/0192144 A1 * | 8/2011 | Yasui | 60/276 |
| 2011/0265452 A1 | 11/2011 | Geveci et al. | |
| 2013/0213011 A1 * | 8/2013 | Audouin | 60/274 |

FOREIGN PATENT DOCUMENTS

EP 2 366 448 A1 9/2011

* cited by examiner

*Primary Examiner* — Jason Shanske
(74) *Attorney, Agent, or Firm* — Taft Stettinius & Hollister LLP

(57) ABSTRACT

Methods and systems are disclosed for determining a feed rate for direct introduction of a reductant gas into an exhaust stream to achieve a $NO_x$ emissions target and for controlling a reductant introduction device to admit the reductant gas into the exhaust stream at the determined feed rate.

16 Claims, 2 Drawing Sheets

SYSTEMS AND METHODS FOR CONTROLLING REDUCTANT DELIVERY TO AN EXHAUST STREAM

TECHNICAL FIELD

The technical field generally relates to controlling emissions in diesel engines and more particularly relates to controlling delivery of a reductant gas directly into an exhaust stream.

BACKGROUND

Presently available internal combustion engines require aftertreatment systems in many cases to meet stringent emissions requirements. In one example of an aftertreatment system, solid materials for ammonia ($NH_3$) storage have been developed as a source of reductant in selective catalytic reduction (SCR). By dosing gaseous ammonia desorbed from solid storage media, the SCR system is capable of working at temperatures below the current limits of traditional urea-based SCR systems. Solid storage media systems for $NH_3$ also operate without the negative aspects associated with urea-derived solid deposit problems in the exhaust system.

However, the use of a solid storage medium for production of gaseous $NH_3$, provides new challenges related to the metering of gaseous $NH_3$ to the exhaust system in order to achieve the desired operational outcomes.

SUMMARY

One embodiment is a technique for direct delivery of reductant gas that is controlled for $NO_x$ reduction in an exhaust system. Other embodiments include unique methods, systems, and apparatus for controlled direct delivery of reductant gas to an exhaust system. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF THE ILLUSTRATIVE EMBODIMENTS

Figure 1:
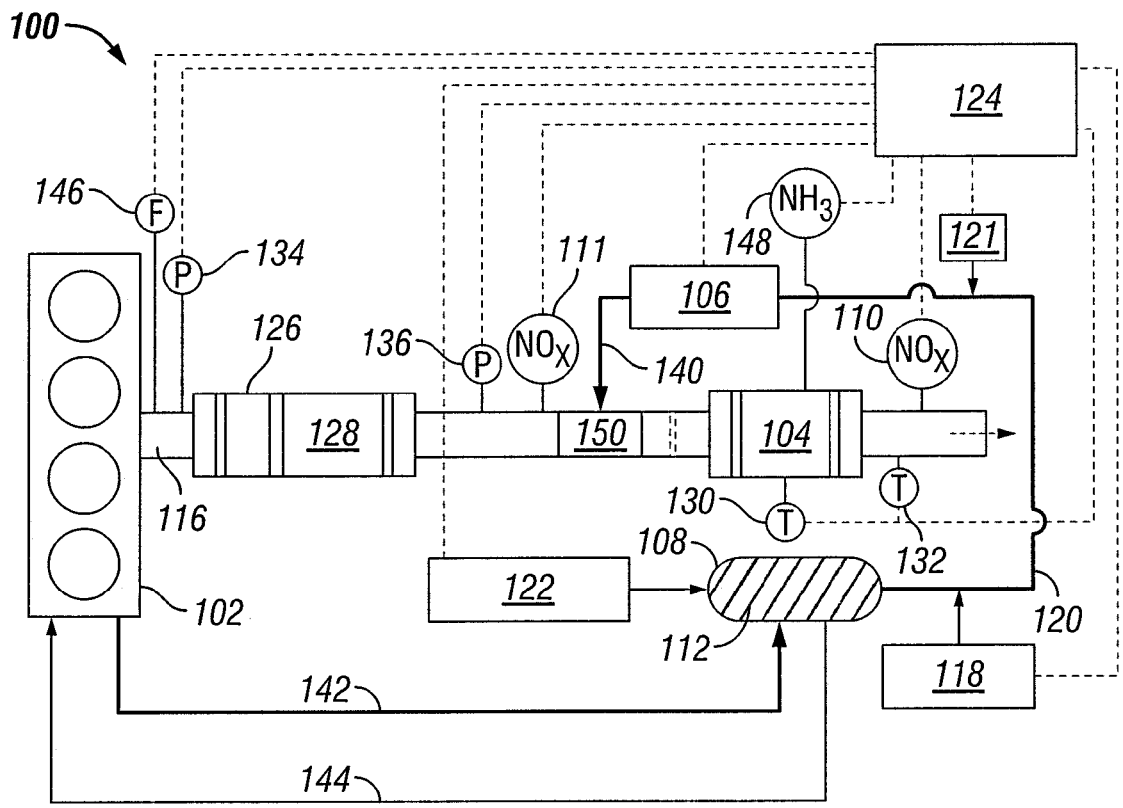
FIG. 1 is a schematic diagram of a system for direct delivery of reductant gas to an exhaust system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 for direct delivery of a reductant gas into an exhaust stream of an exhaust system. As used herein, direct delivery means that the reductant is delivered to the exhaust stream in a form that is suitable for treatment of $NO_x$ emissions without conversion by a reactant and without further requiring decomposition in order to be utilized for effective $NO_x$ reduction over the catalyst. The system 100 includes an internal combustion engine 102 producing an exhaust gas stream into exhaust flow path 116, where the exhaust gas stream travels from engine 102 for emission through a tailpipe or other suitable outlet. In one specific embodiment, engine 102 is a diesel engine. The exhaust output by engine 102 includes $NO_x$ and other components which are to be mitigated using an exhaust aftertreatment system in exhaust flow path 116. System 100 is illustrated schematically and may be included with a car, truck, bus, boat, recreational vehicle, construction equipment or another type of vehicle. Other embodiments include an engine provided in non-vehicular applications such as a generator set.

The system 100 includes an aftertreatment system with a $NO_x$ conversion catalyst 104 in exhaust flow path 116 that reduces at least a portion of the amount of $NO_x$ from the exhaust stream, and a reductant source 108 that stores an amount of $NO_x$ reductant 112 such as, for example, ammonia ($NH_3$), in a solid storage media. $NO_x$ conversion catalyst 104 can be any of various catalysts known in the art. For example, in some implementations, the $NO_x$ conversion catalyst is an SCR catalyst with a zeolite based catalyst, such as a Cu-Zeolite or a Fe-Zeolite catalyst, or a vanadium based catalyst.

In one embodiment, the solid storage media in reductant source 108 may be any material involving adsorption or absorption of molecular ammonia. In one particular embodiment, the solid storage media includes metal ammine salts. The $NO_x$ reductant stored in the solid storage media housed in reductant source 108 may be ammonia or any other reductant understood in the art capable of being stored and selectively released from a solid storage media as a reductant gas for direct delivery to the exhaust stream. In still other embodiments, reductant source 108 is any device capable of supplying pressurized ammonia gas. Reductant source 108 may include one or more storage units having one or more compartments for storing ammonia in solid storage media and/or in gaseous form.

System 100 also includes a reductant supply line 120 that receives reductant 112 released in gaseous form from reductant source 108, and provides the $NO_x$ reductant gas to the exhaust flow path 116 at a position upstream of the $NO_x$ conversion catalyst 104. Gaseous reductant passes through a metering device 106 in reductant supply line 120 to an inlet 140. System 100 further includes a pressure sensor 118 in fluid communication with reductant supply line 120 and a temperature sensor 122 operatively connected to the solid storage media in reductant source 108.

Reductant source 108 is operatively coupled with at least one engine coolant feed line 142 and an engine coolant return line 144. Feed line 142 provides a source of heat that heats the solid storage media stored in reductant source 108 to release the stored reductant in gaseous form. Other embodiments contemplate other means for heating the solid storage media in reductant source 108, including, for example, an electrical heating element coupled to a power source such as a battery or generator. The heat source can be embedded in the solid storage media, or can extend around the outside of the solid storage media, or a combination of these arrangements. In one embodiment, heating of the solid storage material releases gaseous $NH_3$ from the solid storage media into supply line 120 by thermal desorption. Alternate embodiments may also produce gaseous $NH_3$ via thermal decomposition of a solid storage medium. The consumption rate of the released $NH_3$ gas is controlled by metering device 106 as it is injected into exhaust flow path 116 at inlet 140 upstream of the $NO_x$ conversion catalyst 104.

Figure 2:
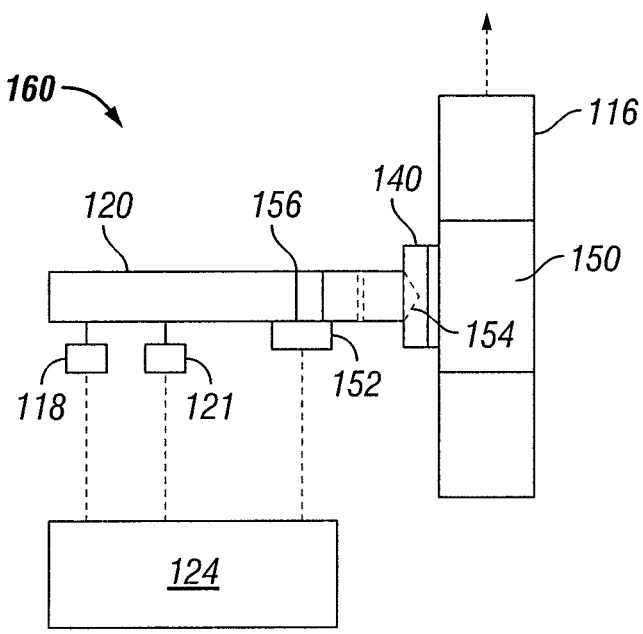
FIG. 2 is a schematic diagram of an apparatus for controlling direct delivery of reductant gas to the exhaust system.

As shown in FIG. 2, system 100 also includes a reductant introduction device 160 for introducing reductant into exhaust flow path 116 from supply line 120. Reductant introduction device 160 includes an actuator 152 that is connected to a flow restriction device 156 in supply line 120. Flow restriction device 156 can be, for example, a plunger, valve or other suitable element that is movable by actuator 152 to vary the size of the inner opening defined by supply line 120 from a fully closed condition to a full flow condition. Actuator 152 can be, for example, a variable position electronic actuator, a hydraulic actuator, solenoid, motor, or other suitable actuator that is connected to controller 124 to receive commands to operate the flow restriction device 156. Supply line 120 further includes an orifice 154 opening into exhaust flow path 116 that is critically sized to admit a maximum allowable flow of reductant gas from supply line 120 to exhaust flow path 116 when flow restriction device 156 is fully open. A mixing device 150 may also be provided at the inlet 140 where supply line 120 joins exhaust flow path 116 to facilitate proper mixing and distribution of reductant gas with the exhaust gases. In addition, temperature sensor 118 and a pressure sensor 121 are operably connected to supply line 120 and controller 124 to provide temperature and pressure conditions for the ammonia gas in supply line 120.

In one embodiment, the exhaust aftertreatment system may include an oxidation catalyst 126 which is in fluid communication with exhaust flow path 116 and is operable to catalyze oxidation of one or more compounds in exhaust flowing through exhaust flow path 116, for example, oxidation of unburned hydrocarbons or oxidation of NO to $NO_2$. Oxidation catalyst 126 can be any of various flow-through oxidation catalysts. Generally, oxidation catalyst 126 includes a substrate with an active catalyst layer configured to oxidize at least some particulate matter (e.g., the soluble organic fraction of soot) in the exhaust and reduce unburned hydrocarbons and CO in the exhaust to less environmentally harmful compounds. For example, in some implementations, the oxidation catalyst 126 may sufficiently reduce the hydrocarbon and CO concentrations in the exhaust to meet the requisite emissions standards.

The exhaust aftertreatment system may also include a diesel particulate filter 128 in fluid communication with exhaust flow path 116 and operable to reduce the level of particulates in exhaust flowing through exhaust flow path 116. In an exemplary embodiment diesel particulate filter 128 is a catalyzed soot filter. The diesel particulate filter 128 can be any of various particulate filters known in the art configured to reduce particulate matter concentrations, e.g., soot and ash, in the exhaust gas to meet requisite emission standards. The diesel particulate filter 128 includes a filter substrate that captures soot and other particulate matter generated by the engine 102. The system 100 periodically regenerates diesel particulate filter 128 to remove particulate matter that has accumulated on the diesel particulate filter over time. For example, diesel particulate filter 128 can be regenerated by increasing the temperature of the exhaust gas above a threshold temperature corresponding with combustion of the particulate matter.

In certain implementations, the system 100 includes an exhaust gas recirculation (EGR) line (not shown) configured to allow a portion of the exhaust gas generated by the engine to recirculate back into the engine for altering the combustion properties of the engine 102. The exhaust aftertreatment system may further include a hydrocarbon (HC) injector (not shown) which is supplied with HC from an HC reservoir and is operationally coupled to the exhaust stream at a position upstream of $NO_x$ conversion catalyst 104. Other embodiments of system 100 may include engine 102 having a common rail fuel system capable of injecting a post injection fuel where at least a portion of the post injection fuel does not combust to provide HC in the exhaust stream. Embodiments are also contemplated without a HC injector.

Certain embodiments may also include an ammonia oxidation AMOX catalyst (not shown) at a position downstream of the $NO_x$ conversion catalyst 104, which is operable to catalyze the reaction of $NH_3$ which slips past the $NO_x$ conversion catalyst 104. In certain embodiments, the AMOX catalyst may not be present, or the AMOX catalyst may be commingled with the $NO_x$ conversion catalyst 104 (or the last $NO_x$ catalyst, where multiple catalysts are present), for example with a washcoat applied toward the rear portion of the last catalyst that is responsive to at least partially oxidize ammonia.

The system 100 may also include at least one $NO_x$ sensor 110 operably coupled to the exhaust flow path 116 at a position downstream of the $NO_x$ conversion catalyst 104. A $NO_x$ sensor 111 may also be operably coupled to the exhaust flow path 116 at a position at or near the inlet of the $NO_x$ conversion catalyst 104. The system additionally or alternatively may include a $NO_x$ sensor positioned upstream of the diesel particulate filter 126 and/or the diesel oxidation catalyst 128 to determine engine-out $NO_x$. Alternatively, the engine-out $NO_x$ may be modeled or calculated from an engine operation map as known to those of ordinary skill in the art.

Additional temperature sensors 130, 132 may be provided at $NO_x$ conversion catalyst 104 and in exhaust flow path 116 downstream from $NO_x$ conversion catalyst 104, respectively. A pressure sensor 134 may be provided in exhaust flow path 116 upstream of diesel particulate filter 128 and a second pressure sensor 136 may be provided in exhaust flow path 116 downstream from diesel particulate filter 128 in order to estimate soot load on diesel particulate filter 128. A mass flow sensor 146 may be provided in exhaust flow path 116 to measure the flow of exhaust gas in exhaust flow path 116. An ammonia sensor 148 may be provided in exhaust flow path 116 mid-bed of $NO_x$ conversion catalyst 104 for measuring ammonia slip. In another embodiment, ammonia sensor 148 is provided downstream of $NO_x$ conversion catalyst 104.

The illustrated sensors are exemplary only, and may be re-positioned, removed, substituted, and other sensors may be present that are not illustrated in FIGS. 1 and 2. Furthermore, various ones of the sensors described specifically herein may be omitted and/or may not be required for various aspects of the systems and techniques disclosed herein. Further, certain sensors may instead be virtual sensors that are calculated from other parameters available to the system, or values that would be indicated by sensors may instead be supplied to a computer readable memory location, via a datalink or network communication, or otherwise be made available to the system where the sensor providing the sensed parameter is not a part of the defined system.

The system 100 further includes controller 124 to perform certain operations for determining and controlling a flow rate of gaseous reductant to exhaust flow path 116 for $NO_x$ reduction. The controller 124 includes modules structured to functionally execute operations to determine a reductant actuator command for actuator 152 to position flow restriction device 156 to provide a desired feed rate of reductant gas into the exhaust gas carried by exhaust flow path 116. In certain embodiments, the controller 124 includes a $NO_x$ conversion module 202, a reductant feed rate module 204, and an actuator control determination module 206. More specific descriptions of the operations of the controller 124 for exemplary embodiments are included in the section referencing FIG. 3.

The system 100 includes reductant introduction device 160 that introduces the pressurized gaseous reductant into the exhaust stream at a determined feed rate to achieve a target $NO_x$ emissions level. In certain embodiments, the reductant includes pressurized ammonia gas, although any $NO_x$ reduction chemical supplied as a pressurized gas is contemplated. In certain embodiments, the system 100 further includes reductant source 108 that stores reductant during portions or all of the engine operations and releases pressurized ammonia gas for introduction directly into the exhaust stream. The systems described herein provide for the controlled release of the ammonia gas to achieve a target reduction of $NO_x$ coming from the engine 102, allowing the use of a smaller $NO_x$ catalyst since catalytic ammonia storage is not required or is lessened over that required in urea-based systems. In addition, engine 102 may be run at higher temperatures for longer periods of times and the control scheme is simplified as compared to urea-based systems due to the direct delivery of reductant gas to the exhaust stream.

In certain embodiments, the controller 124 forms a portion of a processing subsystem including one or more computing devices having memory, processing, and communication hardware. The controller 124 may be a single device or a distributed device, and the functions of the controller may be performed by hardware or software. The controller 124 may be in communication with any sensor, actuator, datalink, and/or network in the system.

In certain embodiments, the controller 124 includes one or more modules structured to functionally execute the operations of the controller 124. In certain embodiments, the controller 124 includes a $NO_x$ conversion module, a reductant feed rate module, and an actuator control module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 3.

In certain embodiments, the system 100 further includes controller 124 structured to perform certain operations to control $NO_x$ aftertreatment systems. The controller interprets an $NO_x$ conversion catalyst space velocity, an $NO_x$ conversion catalyst temperature, and an engine NOx output amount by a $NO_x$ sensor at the inlet 140 or determined from parameters engine output. In response to the $NO_x$ conversion catalyst space velocity, the $NO_x$ conversion catalyst temperature, and the engine $NO_x$ output amount, the controller determines a feedforward $NO_x$ reduction target to meet a $NO_x$ emissions level target. The controller interprets a current $NO_x$ downstream amount and adjusts the feedforward $NO_x$ reduction target. The controller further provides a reductant feed rate command in response to the feedforward $NO_x$ reduction target. The reductant actuator is responsive to the reductant feed rate command to provide reductant gas into the exhaust flow path at a feed rate that achieves the feedforward $NO_x$ reduction target.

In another embodiment, the controller interprets a mid-bed $NH_3$ slip and a $NO_x$ output downstream of the $NO_x$ conversion catalyst. In response to the mid-bed $NH_3$ slip and a downstream $NO_x$ output, the controller determines an outlet $NO_x$ reduction target to achieve a $NO_x$ emissions level target. The controller further provides a reductant feed rate command in response to the $NO_x$ reduction amount. The reductant actuator is responsive to the reductant feed rate command to provide reductant gas into the exhaust flow path at a feed rate that achieves the outlet $NO_x$ reduction target.

Figure 3:
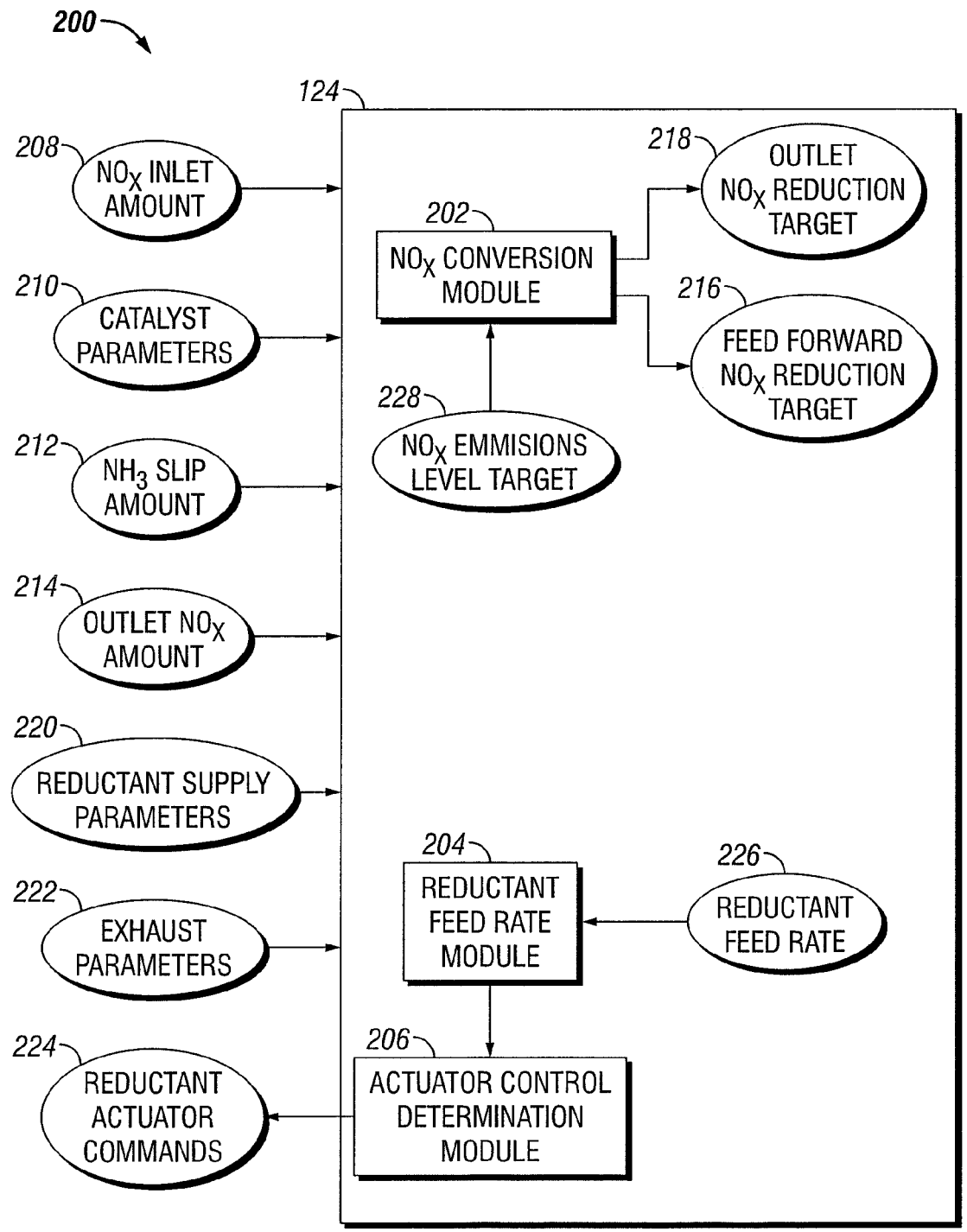
FIG. 3 is a schematic diagram of an apparatus for determining and providing a rate of reductant gas flow into the exhaust system.

FIG. 3 is a schematic illustration of a processing subsystem 200 including a controller 124. In certain embodiments, the controller 124 includes a $NO_x$ conversion module 202 receiving inputs, for example, of $NO_x$ inlet amount 208, catalyst parameters 210, mid-bed $NH_3$ slip amount 212, and outlet $NO_x$ amount 214. $NO_x$ conversion module 202 is operable to determine at least one of a feedforward $NO_x$ reduction target 216 and an outlet $NO_x$ reduction target 218 based on, for example, various engine and aftertreatment operation parameters.

In certain embodiments, the operation parameters used by $NO_x$ conversion module 202 include $NO_x$ sensor 111 positioned upstream of the $NO_x$ conversion catalyst 104 that provides the $NO_x$ inlet amount 208. In other embodiments, $NO_x$ inlet amount 208 may be provided by an engine out $NO_x$ output amount. The engine out $NO_x$ output amount is a description of the amount of $NO_x$ produced by the engine. The engine out $NO_x$ output amount may be determined by a sensor, a model of the engine $NO_x$ production, a map of the engine $NO_x$ output amount according to specified operating conditions, and/or by any other method understood in the art.

In certain embodiments, the parameters used by $NO_x$ conversion module 202 further include catalyst parameters 210, which may include a temperature in system 100 that is descriptive of, or that can be related to, a temperature of $NO_x$ conversion catalyst 104. For example, a bulk bed temperature of an SCR catalyst element, an entry temperature of the SCR catalyst element, a mid-bed temperature of the SCR catalyst element, and/or a temperature of at the SCR catalyst surface are contemplated as exemplary of $NO_x$ conversion catalyst 104 catalyst temperatures. The $NO_x$ conversion catalyst temperature may include one or more temperatures in an average or weighted average, and may be determined from one or more sensors, and/or one or more models or estimates. The catalyst parameters 210 may also include $NO_x$ conversion catalyst space velocity and other parameters understood in the art.

Controller 124 is operable for $NO_x$ conversion module 202 to execute a closed loop procedure that includes an operation to determine a feedforward $NO_x$ reduction target 216 to achieve a desired $NO_x$ emissions target 228. The feedforward $NO_x$ reduction target 216 may be determined by any criteria understood in the art. An exemplary operation to determine the feedforward $NO_x$ reduction target 216 includes determining a $NO_x$ conversion contribution of the $NO_x$ conversion catalyst resulting from the engine out $NO_x$ output amount and the $NO_x$ conversion contribution. The expected or designed contributions of the $NO_x$ conversion catalyst elements are known to one of skill in the art contemplating a specific system, and may depend upon the emissions requirements for the system, the sizing and catalyst loading of the $NO_x$ conversion catalyst, the current temperatures of the $NO_x$ conversion catalyst, and/or other criteria understood in the art.

In another embodiment, controller 124 is operable for $NO_x$ conversion module 202 to execute an open loop procedure that includes an operation to determine an outlet $NO_x$ reduction target 218. The $NO_x$ reduction target 218 may be determined by any criteria understood in the art. In one embodiment, $NO_x$ conversion module 202 interprets a mid-bed $NH_3$ slip amount 212 from ammonia sensor 148 and an outlet $NO_x$ amount 214 from $NO_x$ sensor 110 downstream from $NO_x$ conversion catalyst 104. In response to the mid-bed $NH_3$ slip and outlet $NO_x$ output, $NO_x$ conversion module 202 determines outlet $NO_x$ reduction amount 218 to achieve a desired $NO_x$ emissions target 228.

Controller 124 includes a reductant feed rate module 204 receiving inputs, for example, of reductant supply parameters 220 and exhaust parameters 222. Reductant feed rate module is 204 is operable to determine a feed rate 226 for reductant from supply line 120 into exhaust flow path 116 in order to achieve at least one of feedforward $NO_x$ reduction target 216 and outlet $NO_x$ reduction target 218 to meet $NO_x$ emissions target 228.

Controller 124 includes an actuator control determination module 206 that determines an actuator command for actuator 152 to position flow restriction device 156 in supply line 120 to achieve the reductant feed rate 226 determined from module 204. Actuator control determination module 206 receives inputs, for example, of reductant supply parameters 220 and exhaust parameters 222 along with reductant feed rate 226. Reductant supply parameters 220 include the temperature of reductant gas in supply line 120 measured by, for example, temperature sensor 121 and the pressure of reductant gas in supply line 120 measured by, for example, pressure sensor 118. Exhaust parameters 222 include, for example, a pressure of the exhaust gas in exhaust flow path 116 determined from pressure sensor 134 and a flow rate of exhaust gas in exhaust flow path 116 determined by mass flow sensor 146 or virtually from other operating conditions.

Based on these parameters and inputs, actuator control determination module 206 determines a reductant actuator command 224 so that actuator 152 positions flow restriction device 156 in a position that achieves the target feed rate of reductant from supply line 120 through orifice 154 into exhaust path 116. The operation to provide the reductant actuator command 224 may be determined from a direct calculation made by controller 124 to determine a position of flow restriction device 156 that achieves the reductant feed rate according to the pressure and temperature of the reductant gas in supply line 120 and the pressure of the exhaust gas in exhaust flow path 116. Alternatively or additionally, the position of flow restriction device 156 can be determined by controller 124 referencing a look-up table or operating map that provides reductant actuator commands 224 for various temperatures and pressures of reductant gas in supply line 120 and various exhaust gas pressures in exhaust flow path 116.

In certain embodiments, the operation to provide the reductant actuator command 224 includes selecting one of a high feed rate value or a low feed rate value depending upon a determination that the feedforward $NO_x$ reduction target 216 and/or outlet $NO_x$ reduction target 218 should be increasing or decreasing. In certain embodiments, the controller selects a continuous or semi-continuously variable reductant actuator command as an output of the control operation. Any other operation to determine a reductant actuator command to provide the reductant feed rate to achieve a feedforward $NO_x$ reduction target 216 and/or outlet $NO_x$ reduction target 218 is contemplated herein. Where the physical response is unavailable, for example at system start-up where no current $NO_x$ measure is yet available, a default or initialized value for the reductant feed rate and/or reductant actuator command may be utilized, as understood in the art.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an engine with an aftertreatment system, the aftertreatment system including a reductant source and a supply line connecting the reductant source to an exhaust flow path of the aftertreatment system including a $NO_x$ conversion catalyst;
    determining a reductant feed rate to meet a $NO_x$ emissions level target of an exhaust gas in the exhaust flow path of the aftertreatment system;
    controlling a flow restriction device in the supply line to directly deliver a gaseous reductant released from the reductant source at the reductant feed rate into the exhaust flow path; wherein:
        controlling the flow restriction device includes determining a position of the flow restriction device in the supply line that admits the gaseous reductant at the reductant feed rate and moving the flow restriction device to the position with an actuator; and
        determining the position of the flow restriction device includes determining a temperature and pressure of the gaseous reductant in the supply line and a pressure of the exhaust gas in the exhaust flow path.

2. The method of claim 1, wherein the gaseous reductant comprises ammonia, and wherein the reductant source comprises a solid storage media for the ammonia.

3. The method of claim 2, wherein the solid storage media releases the ammonia in gaseous form when the solid storage media is heated.

4. The method of claim 1, further comprising determining a feed forward $NO_x$ reduction target to meet the $NO_x$ emissions level target based on a temperature of the $NO_x$ conversion catalyst of the aftertreatment system and an $NO_x$ amount at an inlet to the $NO_x$ conversion catalyst.

5. The method of claim 1, further comprising determining a $NO_x$ reduction target to meet the $NO_x$ emissions level target based on an ammonia amount mid-bed of the $NO_x$ conversion catalyst of the aftertreatment system and a $NO_x$ amount downstream from the $NO_x$ conversion catalyst.

6. The method of claim 1, wherein determining the position includes referencing a look-up table of flow restriction device positions to achieve a reductant feed rate based on the temperature and pressure of the gaseous reductant in the supply line and the pressure of the exhaust gas in the exhaust flow path.

7. A system, comprising:
    an internal combustion engine providing an exhaust stream including an amount of $NO_x$ into an exhaust flow path;

a reductant introduction device connected to a reductant supply and to the exhaust flow path, wherein the reductant introduction device is structured to introduce a pressurized reductant gas directly into the exhaust stream;

a flow restriction device located in a supply line that connects the reductant supply to the exhaust flow path and an actuator that is operable to move the flow restriction device;

a $NO_x$ conversion catalyst receiving the exhaust stream downstream from the introduction of the reductant gas into the exhaust stream; and a controller operable connected to the actuator, the controller structured to:

determine a $NO_x$ reduction amount to achieve a $NO_x$ emissions level target for the exhaust stream;

determine a reductant feed rate amount from the $NO_x$ reduction amount to achieve the $NO_x$ emissions target; and control the reductant introduction device to directly introduce the reductant gas into the exhaust stream at the reductant feed rate, wherein the controller is further structured to determine a position of the flow restriction device of the reductant introduction device to introduce the gaseous reductant at the reductant feed rate and to determine the reductant feed rate at least in part from a temperature and a pressure of the gaseous reductant in the supply line and pressure of the exhaust gas in the exhaust flow path.

8. The system of claim 7, wherein the reductant gas is ammonia.

9. The system of claim 8, further comprising a reductant source containing a solid storage media for storing the ammonia in a non-gaseous form.

10. The system of claim 9, wherein the solid storage media releases the ammonia as pressurized gas into a supply line when the solid storage media is heated, and the supply line is connected to the reductant source and to the reductant introduction device.

11. The system of claim 7, wherein the reductant introduction device includes an actuator and a flow restriction device connected to the actuator, wherein the actuator is operable to move the flow restriction device to change the reductant feed rate.

12. The system of claim 7, wherein the controller includes a $NO_x$ conversion module structured to determine the $NO_x$ reduction amount.

13. The system of claim 12, wherein the $NO_x$ conversion module is structured to determine the $NO_x$ reduction amount at least in part from a feed forward $NO_x$ reduction target based on a temperature of the $NO_x$ conversion catalyst and a $NO_x$ amount at an inlet to the $NO_x$ conversion catalyst.

14. The system of claim 12, wherein the $NO_x$ conversion module is structured to determine the $NO_x$ reduction amount at least in part based on a mid-bed ammonia amount of the $NO_x$ conversion catalyst and a $NO_x$ amount downstream from the $NO_x$ conversion catalyst.

15. The system of claim 7, wherein the controller is structured to reference a look-up table of flow restriction device positions to achieve the reductant feed rate based on the temperature and pressure of the gaseous reductant in the supply line and the pressure of the exhaust gas in the exhaust flow path.

16. The system of claim 7, wherein the $NO_x$ conversion catalyst is an SCR catalyst.

\* \* \* \* \*